No. 744,410. PATENTED NOV. 17, 1903.
F. J. ROWSE.
COIN CONTROLLED VENDING MACHINE.
APPLICATION FILED APR. 11, 1903.
NO MODEL. 2 SHEETS—SHEET 1.
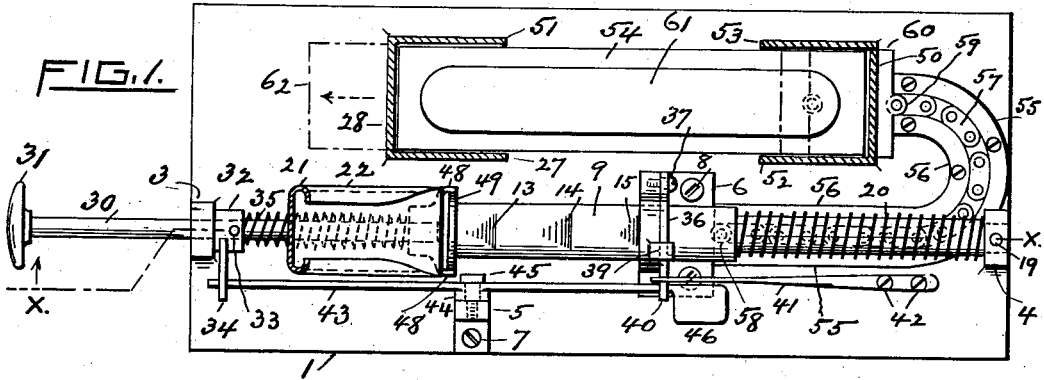
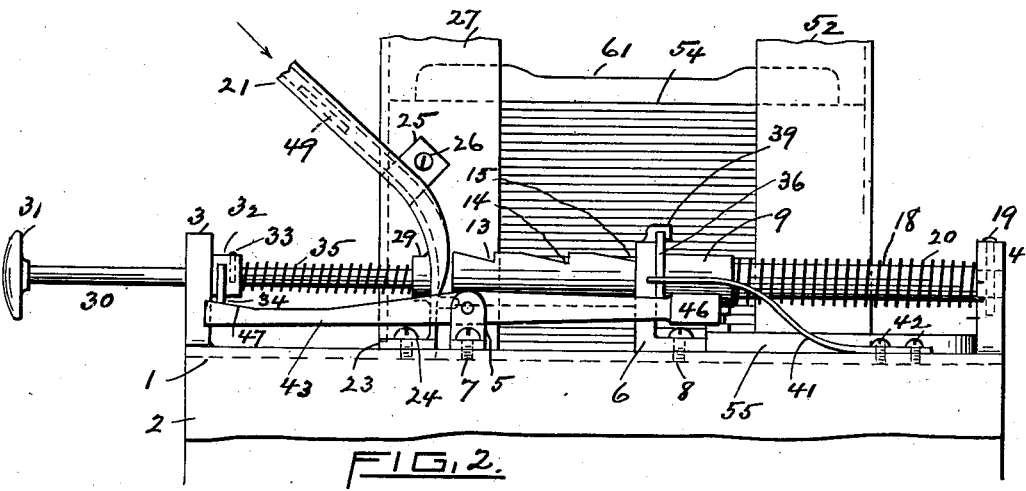
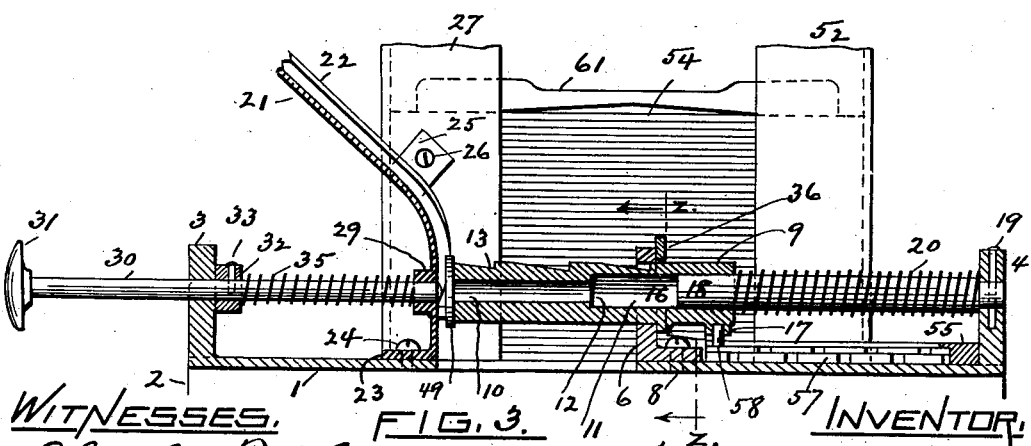
WITNESSES. INVENTOR.
Charles T. Hannigan Frank J. Rowse
Howard A. Lamprey By Warren R. Perce
Attorney.

No. 744,410. PATENTED NOV. 17, 1903.
F. J. ROWSE.
COIN CONTROLLED VENDING MACHINE.
APPLICATION FILED APR. 11, 1903.
NO MODEL. 2 SHEETS—SHEET 2.
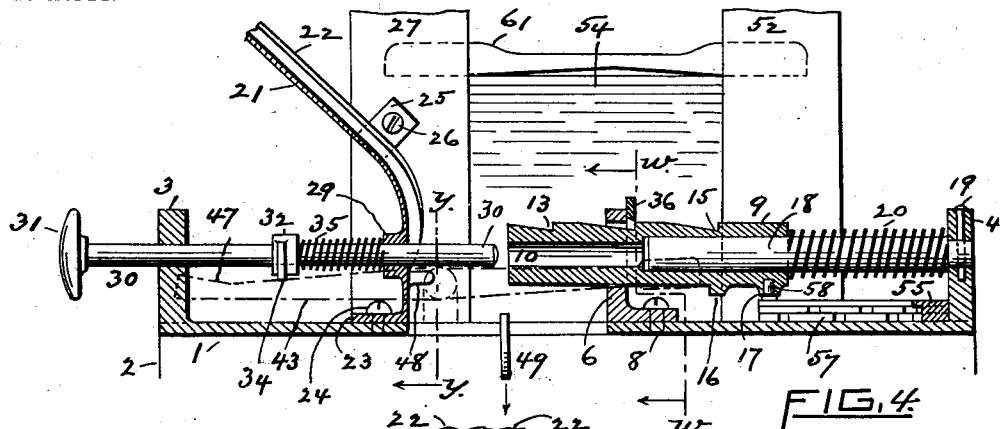
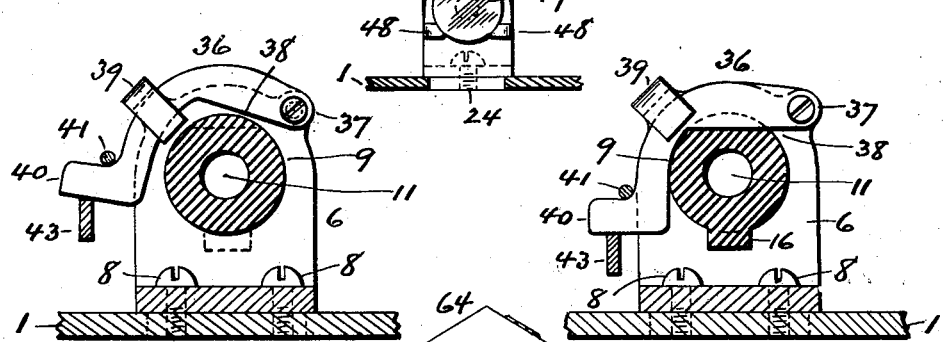
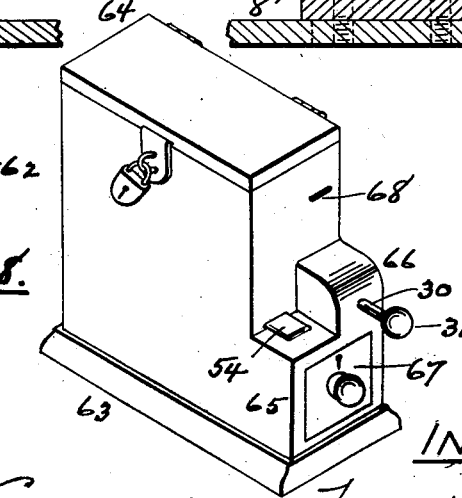
WITNESSES. INVENTOR.
Charles T. Hannigan Frank J. Rowse
Howard H. Lamprey By Warren R. Perce
Attorney.

No. 744,410.

Patented November 17, 1903.

UNITED STATES PATENT OFFICE.

FRANK J. ROWSE, OF PAWTUCKET, RHODE ISLAND, ASSIGNOR TO AMERICAN VENDING MACHINE COMPANY, OF SACO, MAINE, A CORPORATION OF MAINE.

COIN-CONTROLLED VENDING-MACHINE.

SPECIFICATION forming part of Letters Patent No. 744,410, dated November 17, 1903.

Application filed April 11, 1903. Serial No. 152,245. (No model.)

*To all whom it may concern:*

Be it known that I, FRANK J. ROWSE, a citizen of the United States, residing at Pawtucket, in the county of Providence and State of Rhode Island, have invented certain new and useful Improvements in Coin-Controlled Vending-Machines, of which the following is a specification, reference being had therein to the accompanying drawings.

Like numerals indicate like parts.

Figure 1 is a top plan view of my improved vending-machine. Fig. 2 is a front elevation of the same. Fig. 3 is a view as seen partly in front elevation and partly in section on line $xx$ of Fig. 1, the machine being shown in its inoperative position. Fig. 4 is the same as Fig. 3 except that the parts are shown in one of the operative positions. Fig. 5 is a view in side elevation as seen on line $yy$ of Fig. 4. Fig. 6 is a view, partly in elevation and partly in section, as seen on line $ww$ of Fig. 4, the detent being shown in its inoperative position. Fig. 7 is a view, partly in elevation and partly in section, as seen on line $zz$ of Fig. 3, the detent being shown in its operative position. Figs. 6 and 7 are shown on an enlarged scale. Fig. 8 is a perspective view, on a reduced scale, of the case or cabinet in which the operative mechanism of said device is inclosed.

My invention relates to the class of coin-controlled vending-machines; and it consists of the novel construction and combination of the several parts, as hereinafter described, and specifically set forth in the claims.

In the drawings, 1 represents the bed-plate of the machine resting on supports 2, which extend lengthwise of said bed-plate on opposite sides thereof.

At the opposite ends of the bed-plate 1 respectively are the posts 3 and 4. The posts 3 and 4 have round transverse holes or bearings through them, as seen in Figs. 3 and 4, and the post 4 has a vertical longitudinal hole therein, as seen in Figs. 1, 3, and 4. On the bed-plate 1 are secured the posts or supports 5 and 6, each having its base bent to extend horizontally on said bed-plate and secured in place, respectively, by the screws 7 and 8.

A cylinder 9 has a central longitudinal bore 10, Figs. 3 and 4, extending about half-way its length, and also a central longitudinal bore 11 of larger diameter than the bore 10, extending in the same axial line from the bore 10 to the opposite end of said cylinder. At the place where these two bores open into each other there is formed the annular shoulder. (Shown at 12 in Fig. 3.) On the upper side of the cylinder 9 there are three transverse indentations 13, 14, and 15, one side of each of which indentations (that toward the rear or right hand as illustrated in the drawings) is vertical and the other side of which is beveled or sloping, as best seen in Figs. 2 and 4. On the bottom of the cylinder 9 is a projection 16, which serves as a stop and also a boss 17. (Most plainly shown in Fig. 4.)

The post or support 6 has a circular opening or bearing through it in which the cylinder 9 is slidably mounted. Said cylinder is also supported by the round rod 18, which extends in the bore 11 of the cylinder in loose contact therewith. The outer end of the rod 18 is concentrically reduced and enters and is mounted in the transverse hole or bearing provided therefor in the post 4, as shown in Figs. 1, 2, 3, and 4. The rod is secured in position and prevented from rotation by means of a pin 19, which passes down into the vertical hole in the post 4 and through a diametrical hole in the rod 18, as seen in Figs. 3 and 4. The shoulder formed on the rod 18 by the concentric reduction thereof near its outer end abuts the inner side of the post 4, as seen in Figs. 1, 2, 3, and 4, and prevents any longitudinal movement of said rod in an outward direction. A spiral spring 20 surrounds the rod 18 and has its outer end bearing against the inner side of the post 4 and its inner end bearing against the rear end of the cylinder 9.

The coin-chute 21 has two opposite side flanges 22, as seen in Figs. 1 and 5. It extends down to the bed-plate 1, where its end is bent horizontally, as shown at 23, and is there fastened in position by a screw 24. Thus the lower end of the coin-chute 21 constitutes an upright support or post. The chute 21 is also held in position by the piece 25, extending therefrom and fastened by the screw 26 to the side 27 of the magazine or merchandise-holder 28. The chute 21 also has near its lower end a tubular bearing 29. (Best shown in Figs. 3 and 4.)

A push-rod 30 is provided with a knob 31 and is slidably mounted in the aperture or bearing of the post 3 and in the tubular bearing 29 of the chute 21. The push-rod 30 is of such diameter that its inner end loosely slides in the bore 10 of the cylinder 9. It has a block 32 mounted thereon and secured thereto by a pin 33, and a projection or finger 34 extends out from said block, as seen in Figs. 1, 2, and 3. A spiral spring 35 surrounds the push-rod 30 and has its inner end press against the outer edge of the tubular bearing 29 of the chute 21, and its outer end presses against the inner side of the block 32.

A detent 36 consists of a lever-arm pivotally mounted at 37 to a projecting portion of the post or support 6, as seen in Figs. 6 and 7. It has a straight bottom edge 38 and is confined to a vertical plane of movement by the bent-over piece 39, which extends up from the post 6. (Best seen in Fig. 2.) The free end 40 of the detent 36 is bent outwardly, as seen in Figs. 6 and 7. A bent spring 41 is fastened at one end to the bed-plate 1 by screws 42, and its free end is bent upwardly and extends over the outer end 40 of the detent 36 in forcible contact therewith.

A releasing-lever 43 has a tubular bearing 44, by which it is mounted on a screw 45, which enters the post or support 5. At its rear end the lever 43 has a weight 46, and on its upper edge near its forward end it has an outwardly-angular cam edge 47.

At the lower end of the coin-chute 21, where the flanges 22 thereof terminate, are two horns or coin-supports 48. (Best shown in Figs. 1, 4, and 5.)

The coin which enables the machine to operate is shown in Figs. 1, 2, 3, and 5 and is designated 49.

On the bed-plate 1 and extending parallel to the cylinder 9 and rods 18 and 30 is the magazine or holder for the merchandise or wares which are to be vended by the machine. These holders are two in number, (indicated as 28 and 50,) arranged as shown in Fig. 1.

The parts 28 and 50 are set a distance apart, so as to afford an intermediate space to place or inspect the goods. The part 28 has the parallel side pieces 27 and 51, and the part 50 has the parallel side pieces 52 and 53. The parts 50, 52, and 53 do not rest throughout the whole extent of their bottom edges upon the bed-plate 1, but are cut away in part, so as to be somewhat elevated above the bed-plate 1 and so to leave apertures at both ends for the purpose hereinafter explained.

There are two parallel guides 55 and 56, which extend from the foot or base of the post or support 6 and at the rear of the machine are arranged in a semicircular bend and thence extend toward the front in a straight course, as fully illustrated in Fig. 1. Between these guides 55 and 56 is left a channel or groove, and in this a chain 57 moves slidably, which is made up of flat links pivotally connected, as shown in Fig. 1.

One end of the chain 57 is loosely connected by a pin 58 to the boss 17 of the cylinder 9, as best seen in Fig. 4, and the opposite end of said chain is loosely connected by a pin 59 to a push-plate 60, (shown in Fig. 1,) which is movable slidably in the space or aperture between the bed-plate 1 and the cut-away portion of the bottom edges of the parts 50, 52, and 53.

The merchandise (which may be strips of chewing-gum or flat packages of toilet-paper or other articles) is laid in a pile, one piece above another, in the magazine or holder, the side plates 27 51 and 52 53 keeping them in a proper vertical pile, so as to avoid any lateral displacement. These pieces of merchandise are designated in the drawings as 54. A weight 61 upon the top of the pile of pieces 54 presses them down, so that they maintain a proper horizontal position for delivery. The ends of the weight 61 extend between the side plates 27 51 and 52 53 of the magazine, so that it is kept from displacement or accidental removal. The weight 61 is shown in Fig. 3 as cut away centrally, so that only the ends thereof press down upon the pieces 54 of merchandise, it being very desirable and quite necessary for the proper working of the machine that the ends of said pieces 54 shall lie absolutely flat and horizontal. The parts 27, 28, and 51 are also cut away in part at their bottom edges to afford a space for the proper movement of the lowermost piece 54 of the pile of merchandise to be delivered.

In Fig. 8 is shown the case containing said mechanism. As there seen it comprises a box 62, a base 63, and a cover 64. It is built out, as at 65 and 66. A drawer 67 extends in under the supports 2, Fig. 2, and the push-rod 30 extends out through the part 66. There is a slot 68, into which the top of the coin-chute 21 enters. A piece or package 54 is seen protruding from a slot on the front of the case.

Having described all the parts of my said vending-machine, I will now explain its mode of operation.

The normal position of the mechanism is that illustrated in Fig. 2. A coin 49 is thrust through the slot 68, Fig. 8, and enters the coin-chute, as indicated in dotted lines in Fig. 2. The coin 49 descends by gravity to the position shown in Fig. 3, where it is seen as supported vertically by its lower edge coming in contact with and resting upon the two coin-holders or horns 48 48. This position of the coin is best shown in Fig. 5. The coin is then vertical in position and loosely held between the outer end of the cylinder 9 and the inner end of the push-rod 30, as seen in Fig. 3. When the parts are in the position shown in Fig. 3, the detent 36 is elevated, so that it is not in engagement with the cylinder 9. This elevation of the detent 36, Fig. 6, is due to the fact that the forward end of the lever 43 is depressed, because the finger or projection 34 of the block 32 bears down upon the inclined cam edge 47 of the lever 43, thus elevating the rear end of the lever 43 and overcoming the gravity of the weight 46 upon the rear end of said lever. The rise of the rear end of the lever lifts the end 40 of the detent 36. The purchaser now operates the machine by pressing his fingers against the knob 31 of the push-rod 30, thus compressing the spiral spring 35. The inner end of the push-rod 30 is thus moved forward into forcible contact with the coin 49 at the central part thereof. When the push-rod 30 is thus pressed inwardly, the coin 49 is firmly held by the pressure of the push-rod 30 inwardly upon it on the one side and the pressure outwardly upon it on the opposite side, caused by the force of the spiral spring 20, which crowds the cylinder 9 against the coin. The pressure of the operator's hand continuing on the knob 31 moves the coin 49 off of the coin-holders 48, and as now the coin 49 covers the outer end of the bore 10 of the cylinder 9 the cylinder 9 is forced to move to the rear until such time as the detent 36 falls into one of the indentations 14 or 13 on the upper surface of the cylinder. As the cylinder 9 moves inwardly under this continuing pressure the bottom straight edge 38 of the detent 36 easily moves up the sloping sides of the indentations 15 14, and so clears them and automatically drops by its gravity into the indentations 14 or 13, because it is no longer held in its elevated position, as at first. The reason why the detent 36 is not then held up in its elevated position is because as soon as the push-rod 30 has been crowded inwardly a very short distance the finger or projection 34 of the block 32 has moved with the rod, so that it is no longer in contact with the inclined cam edge 47 of the lever 43, and therefore the weight 46 on the rear end of the lever 43 causes the rear end of the lever to descend, and the detent is then free to drop and to take the position shown in Figs. 7 and 4. As the cylinder 9 is thus crowded toward the rear it moves along the supporting-rod 18 and compresses the spiral spring 20. At first the cylinder 9 receives the end of the rod 18 only a short distance, as seen in Fig. 3; but when the cylinder 9 has been moved, as described, to the extent shown in Fig. 4 the forward end of the rod 18 comes into abutment with the internal annular shoulder 12 in the bore of said cylinder, which limits the inward travel of said cylinder upon the rod 18. As soon as the cylinder 9 has been pushed back to a position where the detent 36 can drop into the indentation 14 or 13 on the upper surface of the cylinder 9 and the operator ceases to press on the knob 31 the coin 49 is no longer held by pressure upon its opposite sides, because as the push-rod 30 is moved outwardly by the expansion of its spiral spring 35 the cylinder 9 cannot follow it up, because it is held from movement toward the front by the engagement of the detent 36 in one of the indentations of the cylinder 9. Therefore the coin 49 is wholly unsupported and drops by gravity, as illustrated in Fig. 4, and falls into the drawer 67, which is below it; but while the cylinder 9 has thus been forced to move inwardly the pin 58, which is fastened into the boss 17 of the cylinder 9 on the lower side thereof, moves with said cylinder, and thereby pushes the chain 57. The chain 57 so forced to move in the channel between the guides 56 and 57 (see Fig. 1) causes the push-plate 60 to move in the space between the bed-plate 1 and the bottom edges of the parts 50 52 53 of the magazine. The forward end of the push-plate 60 is in contact with the rear edge of the lowermost piece 54 of merchandise in the pile in said magazine, and consequently said lowermost piece of merchandise is pushed forward out from the magazine through the space therebetween the bed-plate 1 and the bottom edges of the parts 27 28 51 of said magazine to the position indicated by dotted lines at 62 in Fig. 1, in which position it protrudes from the case, as seen in Fig. 8, and may be taken from the machine by the purchaser. The return movements of the mechanism are as follows: The expansion of the spiral spring 35 carries the push-rod 30 out to its original position. The block 32 moves with the rod 30, and its projection 34 coming into contact with the inclined cam edge 47 of the lever 43 depresses the forward end of said lever, and thus elevates the rear end of said lever. The rise of the rear end of the lever 43, bearing as it does up against the end 40 of the detent 36, raises the detent from the position seen in Fig. 7 to the position seen in Fig. 6. The cylinder 9 is no longer locked in its rearward position by said detent 36, but is free to move forward to its original position by the expansive force of the spiral spring 20. This forward movement of the cylinder 9 carries with it the pin 58, which accordingly pulls the chain 57 and brings back the push-plate 60 to its original position, whereupon the weight 61 presses down the pile of pieces 54 of merchandise, so that the next piece to be delivered lies flat on the bed-pate 1 in the magazine and in position to receive the push of the plate 60 when the machine is next operated. The stop 16, coming into abutment with the post or support 6, as seen in Fig. 3, limits this return outward movement of the cylinder 9. Thus the operation of the machine can be repeated as often as coins 49 are introduced into the chute 21 and the stock of merchandise 54 is in position in the magazine ready for delivery.

A new supply of merchandise can be readily put in place whenever the cover 64 of the case is removed, and the accumulated coins can be taken by the proprietor of the machine by opening the drawer 67.

I claim as a novel and useful invention and desire to secure by Letters Patent—

1. In a vending-machine, the herein-described coin-controlled mechanism consisting of the push-rod having a spring-actuated reverse movement, a tube provided with beveled indentations upon its upper surface and also having a spring-actuated reverse movement; a rod rigidly secured at one end to the casing said tube having a portion of its bore of a diameter to receive the inner end of the push-rod and the remainder of its bore of an enlarged diameter to receive the free end of said rigidly-secured rod, a spring-controlled detent pivotally mounted and adapted to engage with said indentations on the tube; a lever pivotally mounted and having its rear end weighted and adapted to contact with the lower free end of said detent and its forward end being provided with an upwardly-inclined cam edge, and a finger or projection rigidly connected to the push-rod and adapted to engage the forward end of said lever, substantially as and for the purpose specified.

2. In a vending-machine, the herein-described coin-controlled mechanism consisting of the push-rod provided with a projection and a tube loosely mounted, and each capable of a spring-actuated reverse movement; a rod rigidly secured at one end to the casing said tube having a bore of suitable diameter at its front end to receive the inner end of the push-rod and a bore of enlarged diameter at its rear end to receive the free end of said rigidly-secured rod, a spring-controlled detent pivotally mounted and adapted to engage any of the indentations of the tube, a lever also pivotally mounted, the one end of which is weighted and adapted to engage with the free end of said detent, while the opposite or front end is provided with an upwardly-inclined cam adapted to engage with said projection upon the push-rod, and a coin-chute provided at its lower end with two horns or coin-holders immediately adjacent to the inner end of the push-rod and the outer end of the tube, substantially as and for the purpose specified.

3. In a vending-machine, the combination of a bed-plate, five upright posts, the first, second, fourth and fifth of which each have a circular aperture or bearing therethrough, a push-rod mounted loosely in the bearings of the first two of said posts, a tube mounted loosely in the bearing of the fourth of said posts and having a portion of its bore of a diameter to receive loosely the end of the push-rod and the remainder of its bore of a larger diameter so as to form an internal annular shoulder and also having on its upper surface three indentations each one of which has its rear side vertical and its forward side beveled, a rod mounted fixedly in the bearing of the fifth of said posts at its outer end and having its inner end loosely fitted in the larger bore of the tube, a spiral spring surrounding the last-named rod and having one end thereof bearing against said fifth post and its other end bearing against the rear end of said tube, a detent pivotally mounted on said fourth post and adapted to engage any of the indentations of the tube, and provided with an outwardly-extending end, a lever pivotally mounted on the third of said posts, having its rear end weighted and adapted to contact with the lower edge of the free end of said detent and its forward end provided with an upwardly-inclined cam edge, a block fastened on said push-rod, a finger or projection on said block adapted to have operative contact with said cam edge of the lever, and a spiral spring surrounding the push-rod one end of which lies against the bearing of said second post and the other end of which bears against said block, substantially as specified.

In testimony whereof I affix my signature in presence of two witnesses.

FRANK J. ROWSE.

Witnesses:
EDWARD L. LOVEJOY,
WARREN R. PERCE.